United States Patent [19]

Wright

[11] Patent Number: 5,234,778

[45] Date of Patent: Aug. 10, 1993

[54] ELECTROCHEMICAL CELL

[75] Inventor: Michael I. Wright, Allestree, England

[73] Assignee: AABH Patent Holdings Societe Anonyme, Luxembourg

[21] Appl. No.: 679,670

[22] Filed: Apr. 3, 1991

[30] Foreign Application Priority Data

Apr. 9, 1990 [GB] United Kingdom ............... 9007998

[51] Int. Cl.$^5$ ..................... H01M 4/36; H01M 6/20
[52] U.S. Cl. .................... 429/103; 429/112; 429/245
[58] Field of Search ............... 429/103, 104, 112, 245

[56] References Cited

U.S. PATENT DOCUMENTS

| | | | |
|---|---|---|---|
| 4,212,933 | 7/1980 | Markin et al. | 429/122 |
| 4,226,922 | 10/1980 | Sammells | 429/104 |
| 4,228,224 | 10/1980 | Heredy et al. | 429/112 |
| 4,398,968 | 8/1983 | Koyama et al. | 148/6.11 |
| 4,440,837 | 4/1984 | Shimotake et al. | 429/245 |
| 4,529,676 | 7/1985 | Galloway et al. | 429/103 |
| 4,546,055 | 10/1985 | Coetzer et al. | |
| 4,560,627 | 12/1985 | Bones et al. | |
| 4,592,969 | 6/1986 | Coetzer et al. | |
| 4,626,483 | 12/1986 | Bones et al. | |
| 4,722,875 | 2/1988 | Wright | |
| 4,797,332 | 1/1989 | Barrow et al. | |
| 4,797,333 | 1/1989 | Coetzer et al. | |
| 4,861,690 | 8/1989 | Hope et al. | 429/245 |
| 4,960,655 | 10/1990 | Hope et al. | 429/245 |
| 4,992,345 | 2/1991 | Meintjes et al. | 429/103 |

FOREIGN PATENT DOCUMENTS

| | | |
|---|---|---|
| 2018500 | 10/1979 | United Kingdom . |
| 2068632 | 12/1981 | United Kingdom . |
| 2193837 | 2/1988 | United Kingdom . |
| 2208033A | 2/1989 | United Kingdom . |
| 2227357A | 7/1990 | United Kingdom . |

OTHER PUBLICATIONS

U.K. Search Report for U.K. Application No. 9106930.2 dated Jun. 20, 1991.

Primary Examiner—Wayne Langel
Attorney, Agent, or Firm—Arnold, White & Durkee

[57] ABSTRACT

The invention provides a high temperature electrochemical power storage cell which has a cathode compartment containing a molten alkali metal aluminium halide molten salt electrolyte and a cathode which comprises an electronically conductive electrolyte-permeable porous matrix. The matrix has, dispersed therein, an active cathode substance $THal_2$ in which Hal is the halide of the electrolyte and T is a transition metal selected from Fe, Ni, Co, Cr, Mn and mixtures thereof, the matrix being impregnated with said molten electrolyte. The matrix comprises the transition metal T of the active cathode substance in porous form and the cathode includes, embedded in the matrix, a metallic current collector having a coating thereon which is chemically and electrochemically inert in the cell environment and is electronically conductive, the metal of the current collector being no more noble than any transition metal of the active cathode substance.

10 Claims, 4 Drawing Sheets

ELECTROCHEMICAL CELL

THIS INVENTION relates to an electrochemical cell. More particularly it relates to a high temperature rechargeable electrochemical power storage cell; to a cathode for such cell; and to a method of reducing the internal resistance of such cell.

According to one aspect of the invention there is provided a high temperature electrochemical power storage cell which comprises an anode compartment containing, at the operating temperature of the cell and when the cell is in its charged state, a molten alkali metal anode, and a cathode compartment containing, at said operating temperature and in said charged state, an alkali metal aluminium halide molten salt electrolyte which is also molten at the operating temperature of the cell, and having the formula $MAlHal_4$, wherein M is the alkali metal of the anode and Hal is a halide, the cathode compartment containing in said charged state, also a cathode which comprises an electronically conductive electrolyte-permeable porous matrix which has dispersed therein an active cathode substance $THal_2$ in which Hal is the halide of the electrolyte and T is a transition metal selected from the group of transition metals consisting of Fe, Ni, Co, Cr, Mn and mixtures thereof, the matrix being impregnated with said molten electrolyte, and, separating the anode compartment from the electrolyte, a separator which comprises a solid conductor of the alkali metal of the anode, the matrix comprising the transition metal T of the active cathode substance in porous form and the cathode including, embedded in the matrix, a metallic current collector having a coating thereon which is chemically and electrochemically inert in the cell environment and is electronically conductive, the metal of the current collector being no more noble than any transition metal of the active cathode substance.

In prior art cells of the type in question, an uncoated current collector which is a metal which is as noble or less noble than the active cathode metal can naturally be used. However, in this case, the current collector can be halogenated upon charging, (and if it is less noble than the active cathode metal it will indeed be preferentially halogenated) so that, in the charged cell, it exists, at least partially, as the halide of the current collector metal. This is a material disadvantage, as in the halide form, it has relatively very low electronic conductivity, which defeats the purpose of having a highly electronic conductive metallic current collector providing a conductive pathway or pathways for electrons, in predetermined positions, and in a predetermined desired layout, in the cathode. Accordingly, when an uncoated metallic current collector is used, it is customary to use, for the metal of this current collector, a transition metal which is more noble than the active transition metal of the cathode, and one which is as inexpensive as possible. Thus, nickel can be used for the current collector when the active cathode metal is Fe, Co, Cr or Mn, although possibly somewhat expensive.

It follows that, while the invention is in principle applicable to all the active transition metal active cathode species specified above, it is of particular utility when the active transition metal of the cathode is eg nickel, as there are few if any other suitable transition metals available at a reasonable cost for use as current collectors which are inert in use in the cathode environment, and use must be made of expensive transition metals more noble than nickel, such as, for example, gold or platinum. Accordingly, the metal of the current collector may be the same as that of the matrix, and said metal may, in particular, be nickel.

By coating a nickel current collector with an inert electronically conductive coating, the above problem is avoided in cells in which the active cathode species is nickel. Accordingly, the description hereunder relates to a nickel current collector in a cathode whose active cathode species is nickel, but it will be appreciated that the concept of the present invention applies equally when the active cathode species is any one of Fe, Co, Cr or Mn, and when the current collector is the same transition metal, or one which is less noble.

Generally, the current collector coating should, apart from being inert, be as electronically conductive as possible and it should be as continuous and as thin as possible compatible with forming a continuous coating which protects the current collector from halogenation by the electrolyte during charging, bearing in mind that it will usually be non-metallic (a metallic coating for a nickel current collector will have to be eg Pt or Au which is prohibitively expensive) and non-metals are typically substantially less conductive than metals.

The Applicant has found that carbon, eg in the form of qraphite, forms a suitable inert electronically conductive coating and at present carbon such as graphite forms the preferred current collector coating material. Thus, the coating on the current collector may be a non-metallic, in particular carbon.

In cells of the type in question, sodium is usually the alkali metal M; the separator is usually nasicon, β-alumina or particularly β"-alumina, which are well-proven conductors of sodium ions; and the Hal of the electrolyte is conveniently chloride. Such a cell has, as its cell reaction:

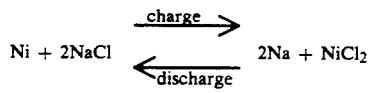

$$Ni + 2NaCl \underset{discharge}{\overset{charge}{\rightleftarrows}} 2Na + NiCl_2$$

(the general reaction being:

$$T + 2MHal \rightleftarrows 2M + THal_2$$

and this reaction provides a theoretical maximum capacity of 0,913 Ah/g Ni with no excess nickel in the discharged cathode, however, with no excess nickel present the entire charged cathode would comprise $NiCl_2$, which is insufficiently electronically conductive for cell utility. It is thus customary to provide excess nickel in the discharged cathode in the form of a porous matrix, so that upon charging and when all the electronically available nickel has been chlorinated, the $NiCl_2$ formed is dispersed in finely divided particulate and/or thin layer form in the remaining nickel of the matrix. It is a matter of indifference precisely which part of the Ni cathode matrix is chlorinated during each charge cycle, and the nickel so chlorinated can vary from cycle to cycle. The Applicant has found, however, that the amount of excess Ni required is such that capacities, in terms of Ah/g Ni, of not much more than 0,3 Ah/g can be obtained, based on the total nickel in the discharged matrix when an uncoated nickel current collector is used. This is because even more excess nickel in the cathode is required, to protect the current collector from chlorination during charging, which chlorination results in degradation of the current collector and in the disappearance of the desirable predetermined electron pathways provided by the current collector.

In contrast, when the nickel current collector is coated with a continuous coating of carbon or graphite according to the present invention, excess nickel can be reduced so that, based on total nickel in the discharged matrix, capacity is increased up to 0,45 Ah/g nickel. This represents a substantial saving in nickel cost.

It is known in the art to provide, when a cell of the type in question is initially loaded upon manufacture thereof, a cathode precursor which functions as a discharged cathode during the first charge cycle upon commissioning of the cell, said precursor being a powder mixture of various constituents, including nickel powder, sodium chloride, and $NaAlCl_4$ as a molten salt electrolyte comprising equimolar proportions of NaCl and $AlCl_3$, as described, for example in U.S. Pat. No. 4,772,875 and as described with optional Al powder in published British Patent Application 2 191 332A. The current collector, eg a strip of nickel is merely embedded in the powder mixture upon loading.

Thus, U.S. Pat. No. 4,722,875 describes a method of making cathodes for cells of the type in question from discharged reaction products from the cathode in particulate form with electrolyte, eg a powder mixture of nickel, sodium chloride and $NaAlCl_4$; and published British Patent Application 2 191 332A describes a method of making such cathodes using, in addition, aluminium, eg a powder mixture of nickel, sodium chloride and aluminium, impregnated with $NaAlCl_4$ electrolyte.

In accordance with the present invention this current collector will be coated with the electronically conductive, electrochemically/chemically inert coating and embedded in the powder mixture in the usual way. After one or more charge cycles the coated current collector becomes embedded in a nickel matrix in which $NiCl_2$ active cathode substance is dispersed in the charged cathode, the matrix being saturated with said $NaAlCl_4$ molten salt electrolyte.

As indicated above, when the current collector is not coated, surplus nickel must be loaded initially, both to provide the matrix, and to protect, as far as possible, the current collector from chlorination, so that cathode capacities of at most about 0,3 Ah/g nickel are achievable. With the current collector coated according to the present invention, surplus nickel is required only to form the matrix but not to protect the current collector, so that capacities of up to 0,45 Ah/g have been achieved. Furthermore, in the prior cells, degradation of the current collector by oxidation/reduction thereof during repeated charge/discharge cycles is still a danger, in spite of the extra nickel loaded to protect the current collector, whereas when the current collector is coated by a continuous coating, this degradation can be in principle entirely avoided.

As indicated above, carbon or graphite coatings have been found to be suitable. In particular, thin flexible graphite foil or paper (eg of those types available in Great Britain under the Trade Marks 'FLEXICARB' and 'GRAFOIL' respectively from Flexicarb Graphite Products Limited, Heckmondwike, West Yorkshire, Great Britain, and Le Carbone Limited, Portslade, Sussex, Great Britain can be adhesively secured to the current collector to coat it, using an adhesive which leaves no residue other than possibly some carbon when sufficiently heated, eg to 300° C. A variety of organic glues can be used and the Applicant has used a cellulose-based wall-paper paste for this purpose. The current collector is coated with the graphite paper and heated to volatilize the glue, before the current collector is loaded into the cathode.

Furthermore, the Applicant contemplates the use of carbon or graphite powder dispersed in a suitable paint or glue, eg in an organic paint or glue, for coating the current collector, the current collector similarly being heated to fix the carbon coating and to volatilize the paint base or glue.

Accordingly, the coating preferably comprises a graphite sheet, adhesively secured to the current collector, or the coating may be a paint coating, the paint comprising carbon powder.

The usual refinements encountered in cells of the type in question are contemplated for the present invention. Thus, U.S. Pat. No. 4,560,627 describes the use of $Co/CoCl_2$ or $Ni/NiCl_2$ as a cathode substance in parallel with a $Fe/FeCl_2$ cathode, to protect the $Fe/FeCl_2$ from overcharging, in cases where the cell of the present invention has an $Fe/FeCl_2$ cathode; U.S. Pat. No. 4,592,969 describes the use of fluoride anions as a dopant in the $NaAlCl_4$ electrolyte of cells of the type in question to resist progressive internal resistance rise associated with sustained cycling and believed to arise from poisoning of $\beta$-alumina separators by $AlCl_3$ in the electrolyte; U.S. Pat. No. 4,626,483 describes the use of chalcogens such as S or Se dopants in the liquid electrolyte and/or active cathode substance to resist progressive reduction in cathode capacity with sustained cycling in $Ni/NiCl_2$ cathodes; published British Patent Application 2 193 837A describes using magnesium dissolved in a sodium anode suitable for the cell of the present invention, when used with a $\beta$-alumina separator, the magnesium acting as a getter for dissolved impurities in the sodium which can accumulate at the sodium/separator interface; and published British Patent Application 2 195 329A describes doping the surface, exposed to the alkali metal of the anode, of a ceramic solid electrolyte separator such as $\beta$-alumina with a transition metal oxide to improve the wettability of the separator surface by molten anode alkali metal such as sodium.

While the separator may in principle, as is known in the art, be a micromolecular sieve which contains the alkali metal of the anode sorbed therein, it is preferably a solid electrolyte conductor of ions of said alkali metal. In particular, M may be sodium, Hal being chloride and the separator being a solid electrolyte conductor of sodium ions.

The invention extends to a cathode for an electrochemical cell as described above, the cathode in its charged state comprising an electronically conductive electrolyte-permeable porous matrix which has, dispersed therein, an active cathode substance $THal_2$ and an alkali metal aluminium halide molten salt electrolyte, which is molten at the operating temperature of the cell impregnated in the matrix, the electrolyte having the formula $MAlHal_4$, wherein M is an alkali metal, Hal is a halide and T is a transition metal, the transition metal T being selected from the group of transition metals consisting of Fe, Ni, Co, Cr, Mn and mixtures thereof, the matrix comprising the transition metal T of the active cathode substance in porous form and the cathode including, embedded in the matrix, a metallic current collector having a coating thereon which is chemically and electrochemically inert in the cell environment and is electronically conductive, the metal of the current collector being no more noble than any transition metal of the active cathode substance.

In more detail, the cathode may be as described above with reference to the cell of the present invention.

The invention also extends to a method of reducing the increase of internal resistance, which arises from repeated charge/discharge cycling, of a high temperature rechargeable electrochemical cell comprising an anode compartment containing, at the operating temperature of the cell and when the cell is in its charged state, a molten alkali metal anode, and a cathode compartment containing, at said operating temperature and in said charged state, an alkali metal aluminium halide molten salt electrolyte which is also molten at the operating temperature of the cell, and having the formula $MAlHal_4$, wherein M is the alkali metal of the anode and Hal is a halide, the cathode compartment containing, in said charged state, also a cathode which comprises an electronically conductive electrolyte-permeable porous matrix which has dispersed therein an active substance $THal_2$ in which Hal is the halide of the electrolyte and T is a transition metal selected from the group of transition metals consisting of Fe, Ni, Co, Cr, Mn and mixtures thereof, the matrix being impregnated with said molten electrolyte, and, separating the anode compartment from the electrolyte, a separator which comprises a solid conductor of the alkali metal of the anode, the matrix comprising the transition metal T of the active cathode substance in porous form, and the cathode including, embedded in the matrix, a metallic current collector of a metal which is no more noble than any transition metal of the active cathode substance, the method comprising the step of coating the current collector with a coating which is chemically and electrochemically inert in the cell environment and which is electronically conductive.

As indicated above, the coating should preferably be continuous, and it should preferably be substantially electrolyte-impermeable.

The invention will now be described, by way of example with reference to the accompanying diagrammatic drawings, in which.

Figure 1:
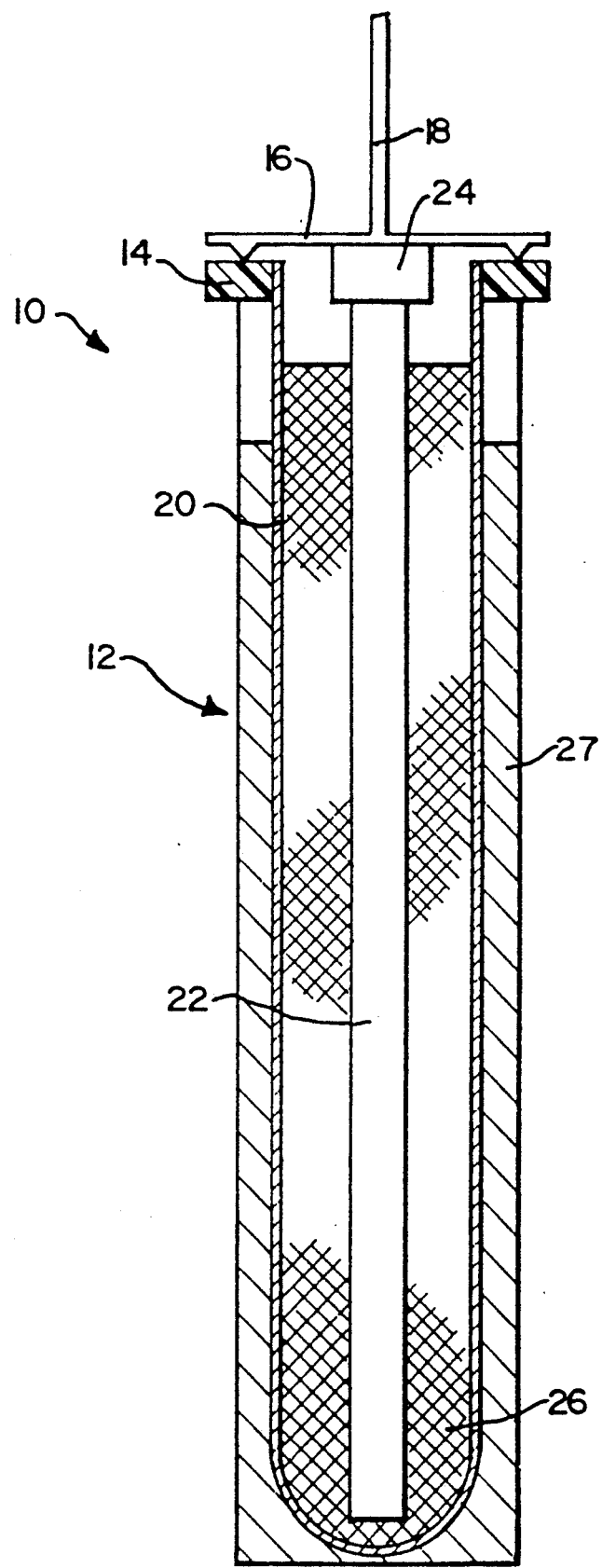
FIG. 1 shows a schematic sectional side elevation of an electrochemical cell in accordance with the invention.

In FIG. 1 of the drawings, reference numeral 10 generally designates an electrochemical cell according to the present invention. The cell has a housing 12 in the form of a cylindrical mild steel can, open at what in FIG. 1 is its upper end. An α-alumina insulating collar 14 is hermetically sealed to the upper end of the housing 12; and a nickel closure 16 in the form of a circular panel, hermetically sealed to the collar 14, closes off the open end of the housing 12. The housing 12 forms the anode (negative) cell terminal; and the closure 16 is provided with a nickel post 18 projecting upwardly, to provide a cell cathode (positive) terminal.

A β-alumina separator tube 20, which acts as a solid electrolyte is concentrically located in, and extends along the interior of, the housing 12, being hermetically sealed to the collar 14, so that it divides the interior of the housing into a cathode compartment (the interior of the tube 20) and an anode compartment (the annular space between the tube 20 and the housing 12). A laterally flattened elongated current collector 22 (described in more detail hereunder with reference to FIGS. 2–4) extends centrally along the interior of the tube 20, downwardly from the closure 16, to which it is electronically connected by a connector 24.

The interior of the tube 20 contains a matrix 26 which is of nickel, the current collector 22 being partially embedded therein. The matrix 26 is porous and is impregnated with and immersed by $NaAlCl_4$ molten salt electrolyte, and has $NiCl_2$ dispersed therein, in the charged state of the cell, as active cathode material, and NaCl dispersed therein in the fully charged state of the cell, to prevent the $NaAlCl_4$ from becoming acid in a Lewis sense. The anode compartment, between the tube 20 and housing 12, contains molten sodium active anode material 27.

Figure 2:
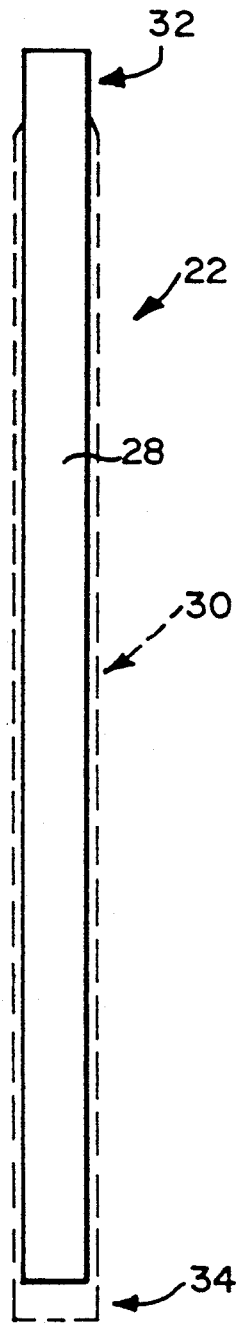
FIG. 2 shows a schematic side elevation of the cathode current collector of the cell of FIG. 1.
Figure 3:
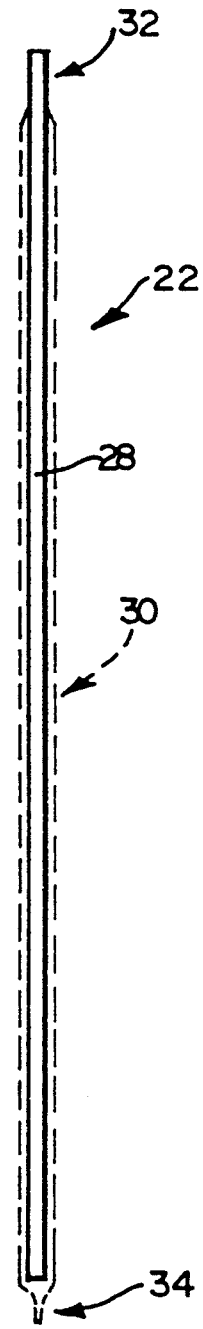
FIG. 3 shows another schematic side elevation, in a direction normal to that of FIG. 2, of the current collector of FIG. 2.
Figure 4:
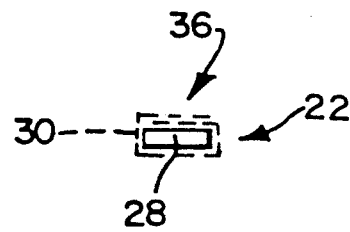
FIG. 4 shows a sectional end elevation, in the direction of line IV—IV in FIG. 2, of the current collector of FIG. 2.

The current collector 22 is of laterally flattened shape and is in the form of a nickel strip having a continuous graphite coating thereon. In FIGS. 2–4 the current collector is designated generally 22, and the metal strip is shown at 28 with the graphite coating at 30 (broken lines).

From FIGS. 2–4 it will be noted that the nickel strip 28 is uncoated at one end at 32 where it enters the connector 24 (see FIG. 1); and that the coating 30 extends away from the end 32 along the length of the strip 28 and encloses the opposite end 34 of the strip 18.

To make the current collector the Applicant has used an organic adhesive such as a 10% by mass solution in water of polyvinyl alcohol or sodium carboxymethyl cellulose to paste a graphite foil 30 of 0,2 mm thickness and density of 1 g/cm³ to a nickel strip 28, the foil being wrapped around the strip 18 with an overlap as at 36 (FIG. 4) leaving part of the strip exposed as at 32 and projecting axially outwardly at the end 34 where it is nipped together and sealed by adhesive. The current collector is then heated to a temperature sufficient to volatilize the base of the adhesive and the leave the graphite foil fast with the strip in the form of the graphite coating 30. The current collector can then be connected at 32 by the connector 24 to the closure 16.

In this regard it should be noted that no more adhesive is used than is necessary to stick the foil in place, followed by drying, eg at 90° C. overnight, to prevent any bubbling or blistering under the foil when it is subsequently heated. In assembling cells of the type in question the Applicant employs a procedure whereby the strip is subjected to 300° C. under vacuum for 2 hrs or more, and the adhesive is needed to keep the foil in place during cell assembly.

Another approach used by the Applicant is to tack the foil down on the strip using a rubber solution so that there is little or no adhesive on the major faces of the nickel strip or foil coating. This tacking is followed by isostatic pressing of the tacked paper on to the strip, eg at 34,500 psi, to shrink the foil on to the strip, thereby to densify the foil, bearing in mind that the foil has a density of 1 g/cm³ whereas pure graphite has a density of 2,25 g/cm³.

The cell 10 is made by subjecting a cell precursor in which the cathode compartment contains a particulate precursor of the cell cathode to a number of charge/discharge cycles to form the nickel matrix having, impregnated therein, the NaAlCl₄ and, dispersed therein in the charged state, NiCl₂ and NaCl. This powder mixture is eg a powder mixture of nickel, NaCl and NaAlCl₄ in which, at the cell operating temperature with the NaAlCl₄ molten, a portion of the nickel reacts in response to a charging potential with a portion of the NaCl according to the reaction:

$$Ni + 2NaCl \rightarrow NiCl_2 + 2Na$$

The lower portion of the current collector 22 is embedded in this particulate precursor when the cell precursor is assembled. When all the electrochemically available nickel has reacted with NaCl, and the cell is fully charged, the remainder of the nickel provides a current collecting function, via which electrons from the sodium ions produced by the above electrochemical reaction (which ions pass in response to the charging potential through the tube 20 into the anode compartment where they receive electrons from the external circuit to form molten sodium active anode material) pass to the current collector 22, being conducted through the graphite coating 30 and nickel strip 28 to the terminal 18 and thence to the external charging circuit.

Instead, the particulate precursor of the cathode can be a particulate mixture of nickel, NaCl, Al and NaAlCl₄. In this case, initially when a charging potential is applied, the Al reacts electrochemically with the NaCl to form NaAlCl₄ in the cathode compartment and Na in the cathode compartment according to the reaction $$4NaCl + Al \rightarrow NaAlCl_4 + 3Na$$

When all the Al has been consumed the Ni then reacts with further NaCl as described above.

In tests conducted by the Applicant a nickel strip was employed which was 216 mm long, 9 mm wide and 1 mm thick. A sheet of graphite paper 30mm wide, 200 mm long and 0,02 mm thick (Flexicarb) was glued to the nickel strip using an organic adhesive of the type used commercially to coat self-adhesive tapes. No more adhesive was used than the minimum necessary to provide continuous adhesion of the graphite sheet to the nickel strip. The portion of folded sheet projecting axially outwardly at the end 34 of the nickel strip was 5 mm in length, and was nipped together with adhesive on the sheet to seal off said end of the nickel strip from the exterior.

From the aforegoing it follows that the overlap at 36 was about 10 mm in width.

A cell of the type shown in the drawing was loaded with a mixture comprising nickel and sodium chloride with a Ni:NaCl mass ratio of 89,15:105,43, with minor proportions of sulphur and fluoride dopants as taught respectively by U.S. Pat. Nos. 4,626,483 and 4,592,964, mentioned above.

Theoretically this mixture should be capable of being cycled over a capacity of 40 Ah at 300° C. when charged at 2A and discharged at 8A to 2,9 V and 1,6 V respectively. The cell was commissioned by adding a 130 g of NaAlCl₄ to the powder, and was taken through several charge/discharge cycles. A capacity of 40 Ah was achieved during the first cycle. This indicates that cell capacity based on nickel in the discharged matrix is in fact 0,45 Ah/g nickel.

The cell reaction was:

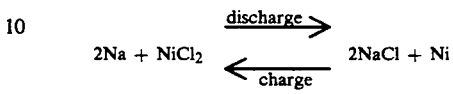

$$2Na + NiCl_2 \underset{charge}{\overset{discharge}{\rightleftarrows}} 2NaCl + Ni$$

and in the discharged state of the cell the nickel, excluding the current collector, formed a unitary porous matrix impregnated by molten NaAlCl₄. It is to be noted that the sulphur and fluoride dopants were added respectively to combat progressive loss of cathode capacity and progressive increase in cell internal resistance. Furthermore, the Applicant's prior experience, with cells of the type in question, is that an identical cell with no graphite coating on the nickel current collector, exhibits for the first cycle, a capacity of 0,3 Ah/g nickel, once again neglecting the nickel of the current collector.

In further tests conducted by the Applicant various essentially similar cells were tested without any foil coating on the nickel strip current collector and with varying amounts of excess nickel in their cathodes. These control cells were compared with similar cells in accordance with the invention, with graphite foil coated nickel strip current collectors. Plots of their discharge capacities against cell cycles are shown in FIGS. 5A-5D and 6.

Figure 5A:
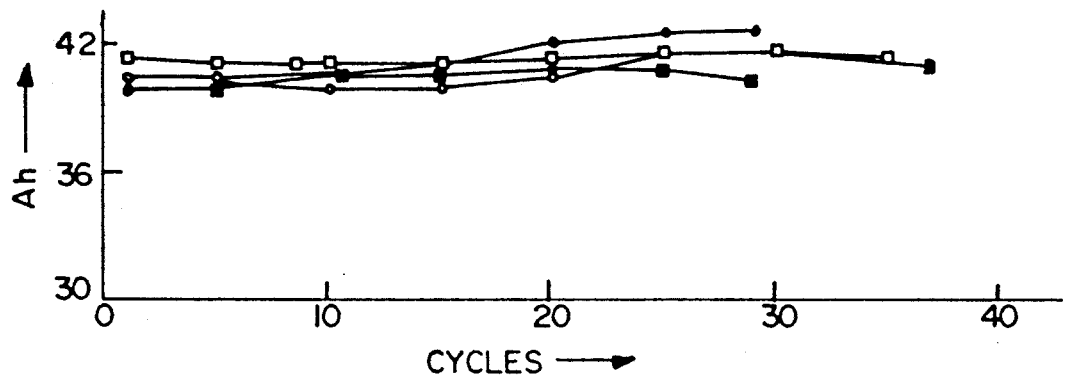
FIG. 5A–5D show plots similar to FIG. 4 of control cells not in accordance with the invention, having different amounts of nickel in their cathode compartments.
Figure 5B:
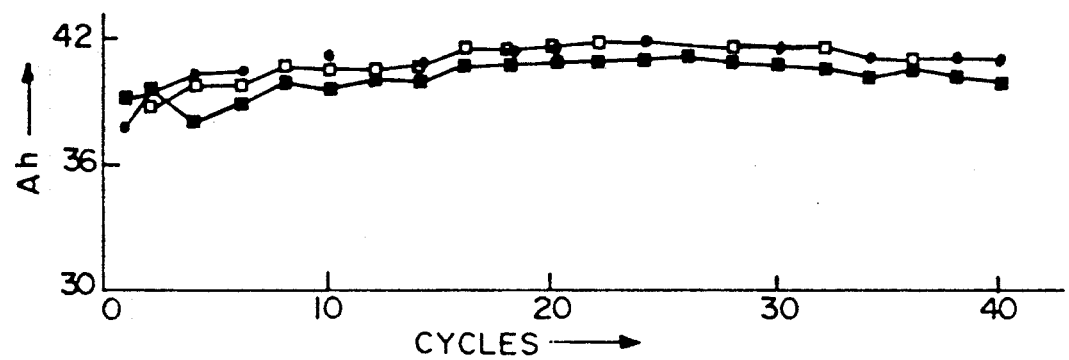
Figure 5C:
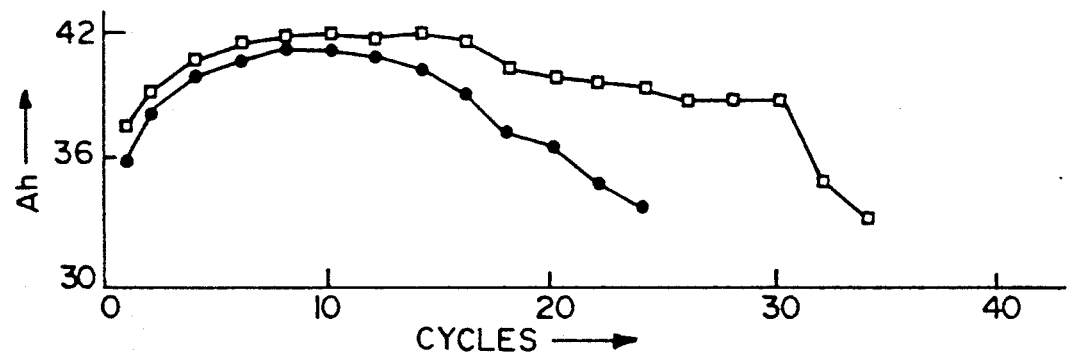
Figure 5D:
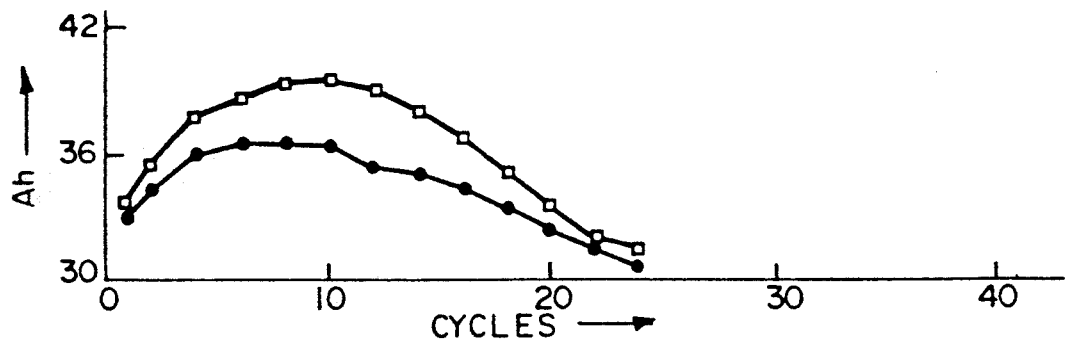
Figure 6:
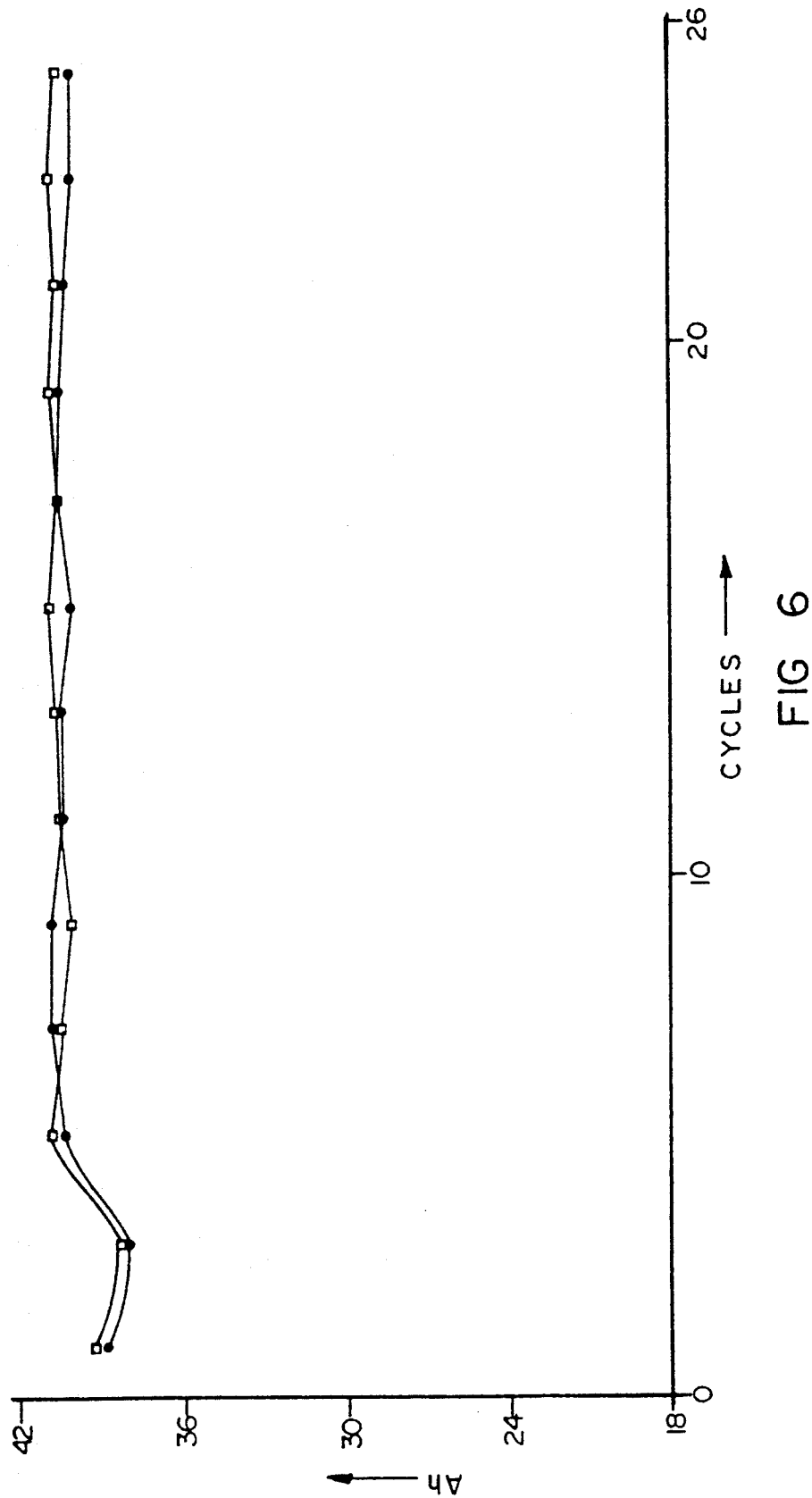
FIG. 6 shows a plot of discharge capacity (Ah) for a cell according to the invention, against cell charge/discharge cycles.

In FIG. 5A the cells had 114 g nickel in their cathodes and had capacities, expressed in Ah/g, of about 0,35 Ah/g nickel. Respective values for the cells of FIG. 5B were 106 g and 0,37 Ah/g; for those of FIG. 5C they were 106 g and 0,4 Ah/g; for those of FIG. 5D they were 89 g and 0,45 Ah/g; and for FIG. 6 they were 89 g and 0,45 Ah/g. FIG. 5A shows results for several cells, FIG. 5B for 3 cells and FIGS. 5C, 5D and 6 for 2 cells respectively.

From FIGS. 5A-5D it is to be noted that as the value of capacity in Ah/g nickel increases, the cells take more cycles to reach maximum capacity and they suffer from a more rapid fall off in capacity with cycling. However, the cells of FIG. 6, which have the same capacity in Ah/g as the worst control cells, ie those of FIG. 5D, in contrast achieve optimum capacity after few cycles and show no fall off in capacity over the test duration (24 charge/discharge cycles).

I claim:

1. A high temperature electrochemical power storage cell which comprises an anode compartment containing, at the operating temperature of the cell and when the cell is in its charged state, a molten alkali metal anode, and a cathode compartment containing, at said operating temperature and in said charged state, an alkali metal aluminium halide molten salt electrolyte which is also molten at the operating temperature of the cell, and having the formula MAlHal₄, wherein M is the alkali metal of the anode and Hal is a halide, the cathode compartment containing in said charged state, also a cathode which comprises an electronically conductive electrolyte-permeable porous matrix which has dispersed therein an active cathode substance THal₂ in which Hal is the halide of the electrolyte and T is a transition metal selected from the group of transition metals consisting of Fe, Ni, Co, Cr, Mn and mixtures thereof, the matrix being impregnated with said molten electrolyte, and, separating the anode compartment from the electrolyte, a separator which comprises a solid conductor of the alkali metal of the anode, the matrix comprising the transition metal T of the active cathode substance in porous form and the cathode including, embedded in the matrix, a metallic current collector having a coating thereon which is chemically and electrochemically inert in the cell environment and is electronically conductive, the metal of the current collector being no more noble than any transition metal of the active cathode substance.

2. A cell as claimed in claim 1, in which the metal of the current collector is the same as that of the matrix.

3. A cell as claimed in claim 2, in which said metal is nickel.

4. A cell as claimed in claim 1, in which the coating on the current collector is non-metallic.

5. A cell as claimed in claim 4, in which said coating is carbon.

6. A cell as claimed in claim 5, in which the coating comprises a graphite sheet, adhesively secured to the current collector.

7. A cell as claimed in claim 5, in which the coating is a paint coating, the paint comprising carbon powder.

8. A cell as claimed in claim 1, in which M is sodium, Hal is chloride and the separator is a solid electrolyte conductor of sodium ions.

9. A cathode for an electrochemical cell, the cathode in its charged state comprising an electronically conductive electrolyte-permeable porous matrix which has, dispersed therein, an active cathode substance $THal_2$ and an alkali metal aluminium halide molten salt electrolyte, which is molten at the operating temperature of the cell impregnated in the matrix, the electrolyte having the formula $MAlHal_4$, wherein M is an alkali metal, Hal is a halide and T is a transition metal, the transition metal T being selected from the group of transition metals consisting of Fe, Ni, Co, Cr, Mn and mixtures thereof, the matrix comprising the transition metal T of the active cathode substance in porous form and the cathode including, embedded in the matrix, a metallic current collector having a coating thereon which is chemically and electrochemically inert in the cell environment and is electronically conductive, the metal of the current collector being no more noble than any transition metal of the active cathode substance.

10. A method of reducing the increase of internal resistance, which arises from repeated charge/discharge cycling, of a high temperature rechargeable electrochemical cell comprising an anode compartment containing, at the operating temperature of the cell and when the cell is in its charged state, a molten alkali metal anode, and a cathode compartment containing, at said operating temperature and in said charged state, an alkali metal aluminium halide molten salt electrolyte which is also molten at the operating temperature of the cell, and having the formula $MAlHal_4$, wherein M is the alkali metal of the anode and Hal is a halide, the cathode compartment containing, in said charged state, also a cathode which comprises an electronically conductive electrolyte-permeable porous matrix which has dispersed therein an active substance $THal_2$ in which Hal is the halide of the electrolyte and T is a transition metal selected from the group of transition metals consisting of Fe, Ni, Co, Cr, Mn and mixtures thereof, the matrix being impregnated with said molten electrolyte, and, separating the anode compartment from the electrolyte, a separator which comprises a solid conductor of the alkali metal of the anode, the matrix comprising the transition metal T of the active cathode substance in porous form, and the cathode including, embedded in the matrix, a metallic current collector of a metal which is no more noble than any transition metal of the active cathode substance, the method comprising the step of coating the current collector with a coating which is chemically and electrochemically inert in the cell environment and which is electronically conductive.

* * * * *